United States Patent
Pini et al.

(10) Patent No.: US 6,842,474 B2
(45) Date of Patent: Jan. 11, 2005

(54) APPARATUS FOR THE GENERATION OF VARIABLE DURATION LASER PULSES

(75) Inventors: Roberto Pini, Impruneta (IT); Renzo Salimbeni, Florence (IT); Salvatore Siano, Campi Bisenzio (IT)

(73) Assignee: Consiglio Nazionale delle Ricerche, Rome (IT)

( * ) Notice: Subject to any disclaimer, the term of this patent is extended or adjusted under 35 U.S.C. 154(b) by 0 days.

(21) Appl. No.: 10/311,120

(22) PCT Filed: Dec. 4, 2001

(86) PCT No.: PCT/IT01/00612

§ 371 (c)(1),
(2), (4) Date: Dec. 12, 2002

(87) PCT Pub. No.: WO02/47216

PCT Pub. Date: Jun. 13, 2002

(65) Prior Publication Data

US 2003/0138004 A1 Jul. 24, 2003

(51) Int. Cl.[7] .............................. H01S 3/11; H01S 3/10; H01S 3/08; H01S 3/082
(52) U.S. Cl. .............................. 372/97; 372/10; 372/25; 372/92
(58) Field of Search .............................. 372/97, 6, 10, 372/25, 64, 69, 92, 98, 99, 100; 385/14, 16, 24

(56) References Cited

U.S. PATENT DOCUMENTS 3,596,104 A * 7/1971 Macomber .................. 250/233
5,963,575 A * 10/1999 Muller et al. .................. 372/92

FOREIGN PATENT DOCUMENTS

FR                2581204 A  * 10/1986  ............ G02B/6/34

* cited by examiner

Primary Examiner—Minsun Oh Harvey
Assistant Examiner—Armando Rodriguez
(74) Attorney, Agent, or Firm—Steinberg & Raskin, P.C.; Grant E. Pollack

(57) ABSTRACT

An apparatus for the generation of variable duration laser pulses comprising an optical cavity delimited by two mirrors, one of which is a total reflection mirror and the other a partial reflection mirror, and containing an active medium with an appropriate excitation system. An optical shutter capable of inducing a Q-switching mode is provided between the total reflection mirror and the active medium. The active medium is optically connected with said total reflection mirror by optical fibre sections having different lengths and may be interchanged in the optical path so as to vary the duration of the pulses emitted by the laser when it operates in the Q-switching mode.

12 Claims, 3 Drawing Sheets

APPARATUS FOR THE GENERATION OF VARIABLE DURATION LASER PULSES

FIELD OF THE INVENTION

The present invention relates generally to laser optics and, more particularly, to an apparatus for generating laser pulses or the like.

According to conventional wisdom, it is not possible to substantially alter the parameter of the emission duration of lasers operating in a high-gain regime. The pulse duration is determined by the time taken to amplify the light radiation during repeated forward and backward passages within the optical cavity. In the case of a high-gain laser, either due to the intrinsic characteristics of the active laser medium or because such high gain is induced with appropriate optical shutters that determine the so-called "Q-switching" mode, the laser amplification and, therefore also, the gain saturation are obtained after just a few passages of the light radiation within the cavity. Since the length of an optical cavity is typically on the order of about one meter, the duration of the pulses emitted under such high-gain conditions does not generally exceed about ten nanoseconds or, at most, several tens of nanoseconds. Accordingly, once the cavity structure and type of active medium have been determined, it is not generally possible to modify the duration of the individual pulses emitted by the system.

The Neodynium: YAG laser, for instance which is perhaps the most widely used of solid state lasers employed for industrial and biomedical applications, typically operates in two distinct and alternative emission regimes. The first is the Q-switching mode described above which, by use of a shutter, produces pulses lasting 5–10 nanoseconds. The second emission regime is the so-called "free running" mode that operates without a shutter and with pulse durations on the order of 0.2–1 milliseconds, determined substantially by the switch-on time of a flash bulb that pumps the laser medium. For this class of lasers, however, no technological solutions are available that produce laser emissions of variable duration in the tine range between these two regimes.

The ability to vary pulse duration within the aforementioned time range would also be particularly advantageous for other laser methodologies. One such technique is the so-called "photoablation" method of surface treatment, the term "photoablation" being understood to mean removal of material from a surface through action of a high-powered pulsed laser. Such methods are used extensively for cleaning, paint stripping and removal of deposits and surface layers, not only in the restoration of art work and monuments, but also for industrial and medical-surgical applications.

The effectiveness of photoablation processes on surface treatment is considered highly dependent upon the duration of the laser pulse. S. Siano et al., for instance, "Cleaning process of encrusted marbles by Nd:YAG lasers operating in free running and Q-switching modes", Applied Optics Vol. 36, pp. 7073–7079, 1997, employs durations that are rather brief, to cleaning of metals, typically on the order of less than a microsecond, in order to minimize the possibility of damage to the substrate due to the high thermal conductivity of these materials. Brief pulses must also be avoided in the case of stony materials because they can induce local photo-mechanical effects (shock waves associated with high instantaneous pressure peaks) that may cause micro-fragmentation and appreciable roughness of the cleansed surface.

As for laser systems operating in the Q-switching mode, when the pulses generated must be transmitted in optical fibers, the fibers themselves often suffer damage. In particular, pulses with a duration on the order of tens of nanoseconds and energies on the order of hundreds of mJ, as is necessary for the aforementioned applications, the power density coupled to the fiber (which typically has a diameter on the order of one millimeter) is close to and may even greater than the critical value at which the fiber begins to suffer damage. It is, therefore, necessary to employ alternative transmission systems as articulated arms. Unfortunately, such arms are less maneuverable than optical cables and, in any case, limit the operating range of the system to a range of 1–1.5 meters from the body of the laser.

OBJECTS AND SUMMARY OF THE INVENTION

It is, therefore, an object of the present invention to provide a laser apparatus that allows the duration of laser pulses to be varied pursuant to each application.

Another object of the present invention is to provide a laser apparatus that allows optimization of high-precision laser working processes, where the efficacy of the laser treatment and safety depend on the ability to control the pulse duration.

Yet another object of the present invention is to provide a laser apparatus that enables the generate pulses to be transmitted by optical fiber cable.

These objects are attained with the apparatus for the generation of laser pulses in accordance with the present invention of which the essential characteristics are set out in claim 1 hereinbelow. Further important characteristics of the apparatus in accordance with the present invention are specified in the dependent claims.

According to one aspect of the present invention, there is provided a pulsed laser having a variable length optical resonator and, more specifically that render variable the distance between a total reflection mirror and a partial refection mirror so as to delimit the optical cavity and, thereby, generate laser pulses of variable duration. To this end, the duration of emitted pulses is varied in discrete steps by using a device that enables variation of resonator length through interchangeable optical fiber sections of different lengths that ae selectively introduced into the optical cavity upon a selected commend from the operator.

BRIEF DESCRIPTION OF THE DRAWINGS

A specific, illustrative apparatus for the generation of variable duration laser pulses, in accordance with the present invention, is described below with reference to the accompanying drawings, in which.

The same numerals are used throughout the drawing figure to designate similar elements. Still other objects and advantages of the present invention will become apparent from the following description of the preferred embodiments.

DETAILED DESCRIPTION OF THE PREFERRED EMBODIMENTS

Figure 1:
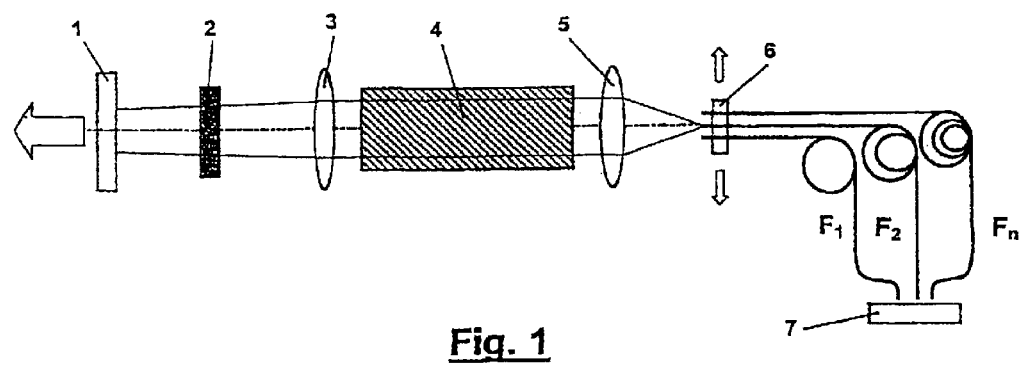
FIG. 1 is a schematic diagram illustrating a principle of an apparatus, in accordance with one aspect of the present invention.

Referring to FIG. 1, the reference number 1 has been used to indicate a partially reflecting output mirror that permits the radiation to be coupled with the outside, while 7 indicates a total reflection rear-end mirror. Mirrors 1 and 7 delimit the optical resonator or optical cavity of the apparatus in the proper sense of these terms, i.e. the resonator or cavity within which there is placed an active material 4 that produces the laser action, a neodymium; YAG crystal for example, and the excitation system associated therewith, though the latter, being of a type known to a person skilled in the art, is not here shown in detail. The reference number 2 identifies an optical shutter that induces the Q-switching mode, of a passive type, an $LiF:F_2$-crystal for example. A lens 3 located between active material 4 and shutter 2 makes it possible to vary the energy density per unit area on the surface of the crystal by varying the diameter of the beam passing through the shutter, this with a view to adjusting the threshold and therefore the time lag during which the crystal becomes optically transparent rather than optically absorbing, thereby enabling the laser to oscillate in the cavity. Shutters of a different type can obviously be employed, including electro-optical and acousto-optical shutters, all well known to a person skilled in the art, but the solution envisaged in the present embodiment does in any case constitute a simplification of the apparatus, because it does not require the use of feed and control systems as would be the case if-active shutters were to be employed.

The output ends of several optical fiber sections (for instance, three in the present embodiment of the invention), each having different lengths, are preferably situated in front of total reflection mirror 7 which closes the optical cavity The sections are identified in FIG. 1 as $F_1$, $F_2$ and $F_n$. The input of each end of the sections is connected to a device 6 that enables the sections to be individually selected by bridging them, one at a time, to a focal point of a lens 5. The lens has an anti-reflection treatment that constitutes the optical system for coupling the laser radiation to a particular optical fiber.

Figure 2:
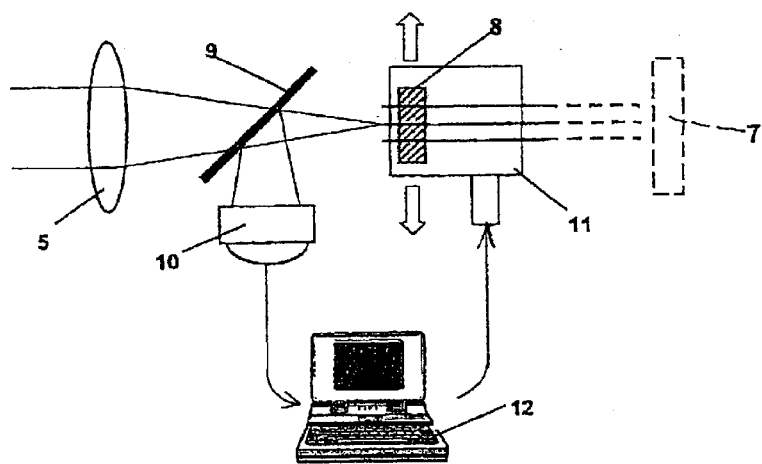
FIG. 2 illustrates a system for controlling the positioning of optical fiber sections, according to one aspect of the present invention.

FIG. 2 shows another embodiment of activation device 6, this one contemplating the use of a relatively high-precision electromechanical displacement unit 11 that includes, for example, a stage having a linear resolution of about 10 microns operated by either a step motor or a direct current motor with zero reference, such as Model MT-65 of MICOS GmbH or the like, controlled by a microprocessor 12. Rigidity connected with this unit is an item of equipment 8 to which there are secured the input ends of the various optical fibers, so that the input face of each of these fibers can be brought to the focal point of coupling lens 5 as and when required. The fibers may be affixed to an item of equipment 8 using a connector of the standard SMA type in which the SMA receptacle of each fiber is made integral with the item, while the input end of the fiber terminates with the appropriate male SMA connector.

Displacement device 11 is preferably provided with a feedback control system for centering the fiber at the focal point. The system includes, for example, a beam splitter in the form of a partially reflective plate 9 inserted between lens 5 and displacement device 11, and inclined at about 45° relative to the optical axis. The plate intercept a relatively minimal fraction of the beam issuing from the optical fiber and sends it to a measuring instrument 10, e.g., a calibrated photodiode, to check the energy content. The read value is recorded by microprocessor 12, which also compares the value with the value corresponding to the previous position and, using successive adjustment cycles, maximizes the energy value, thereby optimizing the centering of the fiber on the optical axis of the system by controlling the movement of the displacement device.

Figure 3:
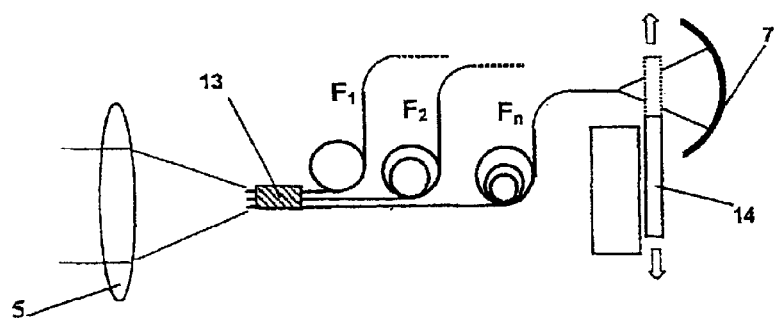
FIG. 3 illustrates a control system for positioning optical fiber sections, according to another aspect of the present invention.
Figure 4:
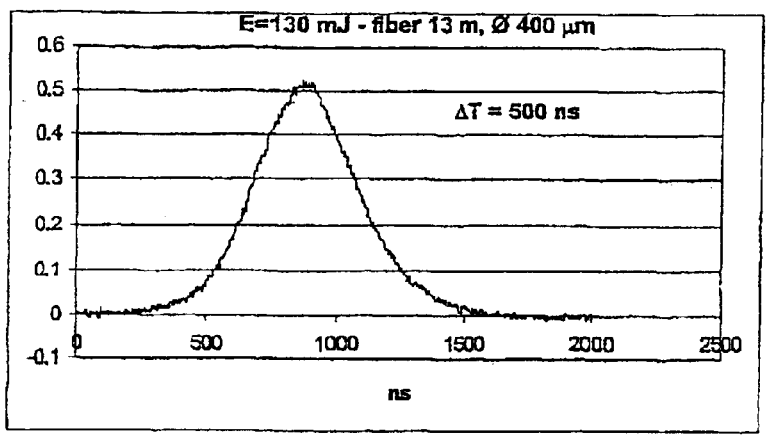
FIGS. 4, 5 and 6 illustrate laser pulses of different durations that can be obtained when resonator length is varied using an apparatus, in accordance with the present invention (the ordinates of the curves being in arbitrary units)
Figure 5:
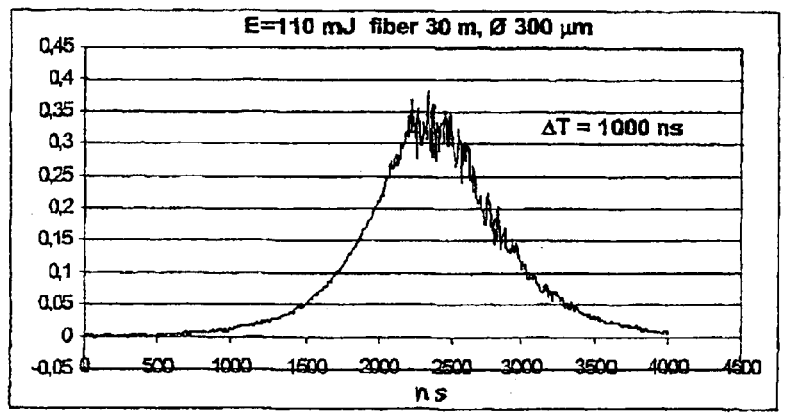
Figure 6:
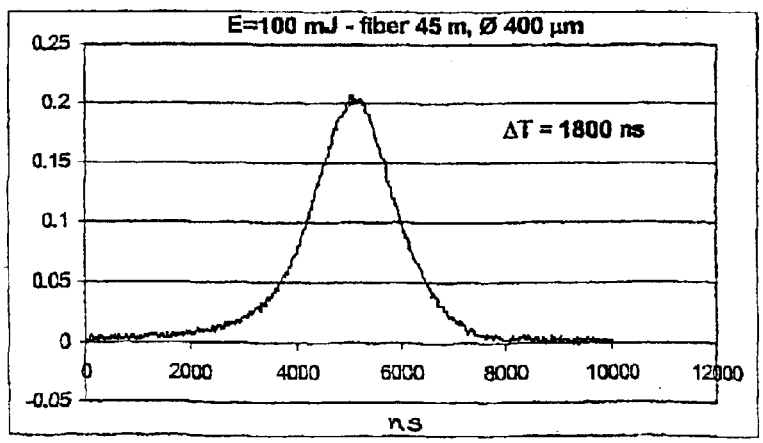

According to another embodiment of the activation device of the individual fibers, as shown in FIG. 3, the input ends of the optical fibers remain fixed with respect to each other and are illuminated simultaneously. In this arrangement, lens 5 is used to achieve a rather wider focus than in the previous case. Also, optical fibers assembled into a compact bundle—identified in FIG. 3 by reference number 13—in such a manner as to enable each input end to collect more or less the same fraction of radiation. The selection of individual fibers is then obtained by a shutter 14 between the output end of each fiber and total reflection rear-end mirror 7. In the embodiment illustrated in FIG. 3, shutter 14 is provided by a servo-controlled actuator that optically blocks the output end of the fiber. In this case, rear mirror 7 is spherical and concave in order to maximize backward coupling in the fiber and allow insertion of the shutter.

Figure 7:
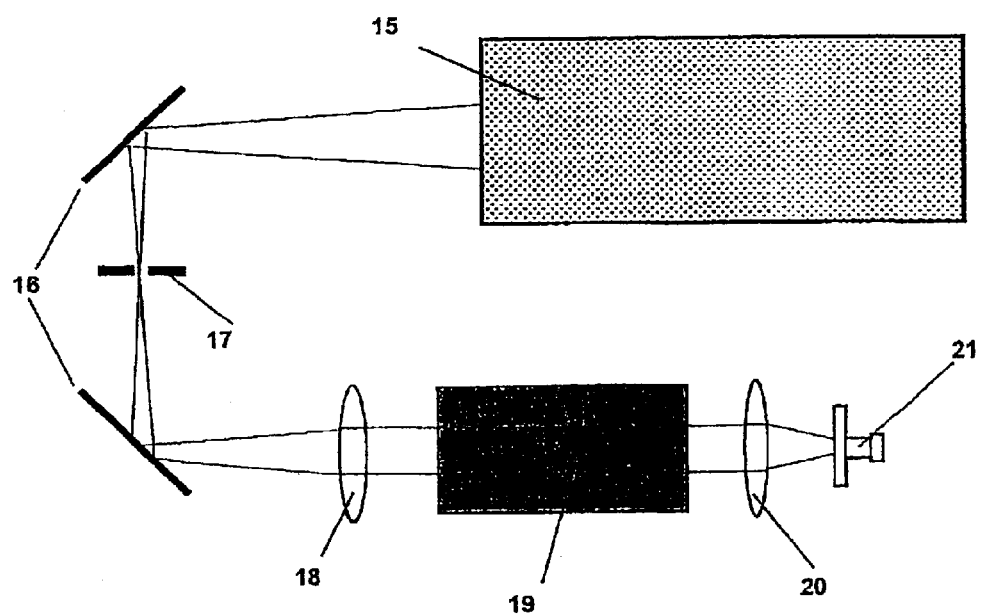
FIG. 7 is a schematic diagram showing an oscillator-amplifier assembly of an apparatus, according to one aspect of the present invention.

As will be appreciated by those skilled in the art, the apparatus, in accordance with the present invention, is desirably employed as an oscillator in a laser equipment layout of an oscillator-amplifier type for substantially increasing the energy of the emitted radiation. In such an arrangement, illustrated in FIG. 7, amplifier 19 is provided by a further Nd:YAG module of a standard type, while the reference number 15 indicates the apparatus according to the invention, which serves as the oscillator. Blocks 15 and 19 are coupled in a conventional manner using optical system consisting of two facing total reflection mirrors 16 arranged at about 45° relative to the optical axes of the blocks and a pinhole 17 on the optical path between the two mirrors for blocking undesired components of the laser beam, as well as a lens 18 downstream of the mirrors for concentrating the beam onto amplifier 19. A further lens 20 is provided downstream of X amplifier coupling the beam into the optical fiber using an optical fiber connector 21.

The time patterns of some pulses obtainable by and apparatus in accordance with the present invention, are included herein by way of example. In this connection FIGS, 4, 5 and 6 show laser pulses having durations of 500, 1000 and 1800 nanoseconds (at half-height) corresponding to a cavity length modified through the successive insertion of optical fibers having lengths of about 13, about 30 and about 35 meters respectively, and a core diameter between about 300 and about 400 microns. The energies of these pulses are greater than a" 100 mJ and are already suitable for many material cleansing applications. If necessary, the emission can be further increased, up to about one Joule per pulse and even greater, by including an additional laser amplification stage, as indicated above.

Finally, should pulses be desired having an even longer duration than can be obtained with the different labs of optical fibers set forth herein, crystal 2 producing the passive Q-switching effect may be removed to obtain a "free running" mode emission with typical durations on the order of about one millisecond. This may be achieved by using a relatively simple actuator controlled from the outside, because the alignment of crystal 2 within the laser cavity is not considered to be as critical as the alignment of all of the other optical components.

An apparatus for generating variable duration laser pulses, in accordance with the present invention, achieves the aforementioned objectives and advantages by varying the length of the optical path of the resonator, which is obtainable by relatively simple modification of the basic structure of a laser apparatus. As a result, it is now possible to generate laser pulses of variable duration and, in turn, optimize the operating mode of the laser apparatus for specific and different applications and conditions ore, since variations of the pulse duration make it possible to reduce the power density in the optical fiber, the laser pulses can be transmitted by optical fiber cables without the risk of damaging these sables. Since laser transmission in optical fibers is problematic only for pulse durations on the order of 10 ns or less, by lengthening of the pulse duration to more than 100 as through insertion of optical fibers into the laser cavity, the possibility of damage to the optical fibers either within or outside the cavity is avoided.

Various modifications and alterations to the present invention may be appreciated based on a review of this disclosure. These changes and additions are intended to be within the scope and spirit of the invention as defined by the following claims.

What is claimed is:

1. An apparatus for the generation of laser pulses comprising an optical cavity delimited by two mirrors, one of the mirrors being a total reflection mirror and the other being a partial reflection mirror, and having an active medium complete with a selected excitation system, wherein an optical shutter capable of inducing a Q-switching mode is provided between the total reflection mirror and the active medium the active medium being optically coupled to the total reflection mirror by optical fiber sections having different lengths and bang selectively interchangeable in the optical path, such that the length of the laser cavity can be selected when the laser operates in the Q-switching mode so as to vary the length of the laser pulse.

2. The apparatus set forth in claim 1, wherein the optical sections have output ends situated generally in front of the total reflection mirror and input ends arranged generally at a focal point of a lens coupling them to the active medium.

3. The apparatus set forth in claim 2, wherein a device is provided for selectively centering one of the input ends of the optical fiber sections at the focal point of said coupling lens, the device comprising a support of the ends connected to a motor-operated stage.

4. The apparatus set forth in claim 3, wherein the motor-operated stage is driven by a feedback control.

5. The apparatus set forth in claim 4, wherein the feedback control comprises a beam splitter oriented at an angle of about 45° relative to the optical axis in order to intercept a relatively minute fraction of the beam issuing from the optical fiber, a measuring instrument for determining the energy of the beam fraction, and a device for comparing a current measurement with a previous measurement, so as to maximize the measured value following successive positionings of the fiber end centering device.

6. The apparatus set forth in claim 2, wherein the input ends of the optical fiber sections of different lengths are arranged in a stationary bundle at the focal point of the coupling lens, a displaceable optical block being provided between the output end of each optical fiber and the total reflection mirror so as to vary the length of the laser cavity according to the length of the optical fiber section selected.

7. The apparatus set forth in claim 6, wherein the total reflection mirror is generally spherical and concave.

8. The apparatus set forth in claim 1, whereupon removal of the optical shutter, capable of inducing a Q-switching mode, from the optical path, the laser operates in a free-running mode.

9. The apparatus set forth in claim 1, wherein the optical shutter, capable of inducing a Q-switching mode, is of a passive type and in conjunction with a lens arranged between it and the active medium in order to vary the energy density per unit area of the shutter surface.

10. The apparatus set forth in claim 1, wherein the optical shutter is of a passive type and is constituted by an $LiF:F_2$-crystal.

11. An amplifier-oscillator system having an amplifier component and an oscillator component, the amplifier component comprising a first laser system and the oscillator component comprising a second laser system, the second laser system including au apparatus for the generation of laser pulses comprising an optical cavity delimited by two mirrors, one of the being a total reflection mirror and the other being a partial reflection mirror, and having an active medium complete with an appropriate excitation system wherein an optical shutter capable of inducing a Q-switching mode is provided between the total reflection mirror and the active medium, the active medium being optically coupled to the total reflection mirror by optical fiber sections having different lengths and being selectively interchangeable in the optical path, such that the length of the laser cavity can be selected when the laser operates in the Q-switching mode so as to vary the length of the laser pulse.

12. The apparatus set forth in claim 1, further comprising a coupling to optical fiber cable at an output side thereof.

\* \* \* \* \*